US008794513B2

(12) United States Patent  
Wayne et al.

(10) Patent No.: US 8,794,513 B2
(45) Date of Patent: Aug. 5, 2014

(54) SELF-SERVICE DEVICE SERVICING UTILIZING A HARDWARE DATABASE

(71) Applicant: Bank of America Corporation, Charlotte, NC (US)

(72) Inventors: Karen Wayne, Glendale, MO (US); Cheryl S. Bond, Fairview Heights, IL (US); Kyle Browne, Charlotte, NC (US); Nathan Dent, Concord, NC (US); Kimberly Schoonover, Imperial, MO (US)

(73) Assignee: Bank of America Corporation, Charlotte, NC (US)

( * ) Notice: Subject to any disclaimer, the term of this patent is extended or adjusted under 35 U.S.C. 154(b) by 127 days.

(21) Appl. No.: 13/627,461

(22) Filed: Sep. 26, 2012

(65) Prior Publication Data

US 2014/0084052 A1    Mar. 27, 2014

(51) Int. Cl.
*G06F 17/00* (2006.01)
(52) U.S. Cl.
USPC ............................................................. 235/379
(58) Field of Classification Search
CPC ...... G07F 19/20; G07F 19/201; G06F 19/209
USPC ............................................. 235/379; 902/8
See application file for complete search history.

(56) References Cited

U.S. PATENT DOCUMENTS

| | | | |
|---|---|---|---|
| 6,327,365 B1 * | 12/2001 | Kiger, II | 379/357.03 |
| 6,779,717 B1 | 8/2004 | Somers, Jr. | |
| 6,866,194 B2 * | 3/2005 | Scheurer | 235/385 |
| 6,908,032 B1 | 6/2005 | Somers, Jr. et al. | |
| 6,966,487 B1 | 11/2005 | Somers, Jr. et al. | |
| 6,970,846 B1 | 11/2005 | Drummond et al. | |
| 6,991,156 B1 | 1/2006 | Somers, Jr. | |
| 7,063,253 B1 | 6/2006 | Brausch et al. | |
| 7,093,749 B1 | 8/2006 | Block et al. | |
| 7,093,750 B1 | 8/2006 | Block et al. | |
| 7,356,393 B1 * | 4/2008 | Schlatre et al. | 701/29.3 |
| 7,571,850 B2 | 8/2009 | Barcelou | |
| 7,575,158 B2 | 8/2009 | Barcelou | |
| 7,591,420 B2 | 9/2009 | Barcelou | |
| 7,597,248 B2 | 10/2009 | Barcelou | |
| 7,597,251 B2 | 10/2009 | Barcelou | |
| 7,600,677 B2 | 10/2009 | Barcelou | |
| 7,617,973 B2 | 11/2009 | Barcelou | |
| 7,621,444 B2 | 11/2009 | Barcelou | |
| 7,699,220 B2 | 4/2010 | Barcelou | |
| 7,762,454 B2 | 7/2010 | Block et al. | |
| 7,793,830 B2 | 9/2010 | Barcelou | |
| 7,802,718 B2 | 9/2010 | Barcelou | |

(Continued)

*Primary Examiner* — Seung Lee
(74) *Attorney, Agent, or Firm* — Banner & Witcoff, Ltd.; Michael A. Springs

(57) ABSTRACT

A system and method of utilizing a hardware database with a master ticket or a support ticket for individual financial self-service devices, such as an automated teller machine (ATM), that provides a technician with information about the self-service device and improves the self-service device servicing process is provided. The self-service device service system may include a processor; a self-service device, wherein the automated teller machine includes a self-service device support ticket attached to the self-service device; a self-service device hardware database that includes information about a plurality of self-service devices; and a handheld wireless device configured to scan and store the set of data from the self-service device support ticket and communicate the set of data to the self-service device hardware database.

20 Claims, 4 Drawing Sheets

(56) References Cited

U.S. PATENT DOCUMENTS

| | | |
|---|---|---|
| 7,837,101 B2 | 11/2010 | Barcelou |
| 8,118,222 B2 | 2/2012 | Barcelou |
| 8,132,714 B2 | 3/2012 | Barcelou |
| 8,132,715 B2 | 3/2012 | Barcelou |
| 8,132,724 B2 * | 3/2012 | Hayashi ................. 235/382 |
| 8,474,693 B1 * | 7/2013 | Myana et al. ........... 235/379 |
| 2011/0202393 A1 * | 8/2011 | DeWakar et al. ........ 705/13 |
| 2012/0141136 A1 * | 6/2012 | Blume ..................... 398/140 |

\* cited by examiner

SELF-SERVICE DEVICE SERVICING UTILIZING A HARDWARE DATABASE

BACKGROUND

The increased use of self-service device may result in additional malfunctions and/or service calls. Examples of self-service devices may be an automated teller machine or ATM. These service calls can be costly and time consuming, particularly if a malfunction or break down occurs on a weekend and/or holiday. Additionally, technicians may be dispatched to a self-service device and have limited information of what the problem is and what kind of machine and parts are associated with the self-service device. Accordingly, a system and method of utilizing a hardware database with a master ticket or a support for each individual self-service device to provide the technician information about the self-service device and to improve the self-service device servicing process would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, an automated teller machine system includes: a processor; a self-service device; and a self-service device hardware database that includes information about a plurality of self-service devices. The self-service device may include a self-service device support ticket attached to the self-service device. A set of data from the self-service device support ticket may be scanned during a maintenance request and the set of data is transferred to the self-service device hardware database. The self-service device support ticket may include one or more of the following: self-service device model number, self-service device serial number, services, required, printer configuration, software configuration, component numbers, or part numbers. The self-service device support ticket may be a barcode and may be located on a rear-panel or inside the device chassis of the self-service device. The self-service device system may further include a handheld wireless device configured to scan and store the set of data from the self-service device support ticket and communicate the set of data to the self-service device hardware database. The processor and the self-service device hardware database may provide predictable faults and maintenance for the self-service device.

In another aspect of the invention, the processor and the self-service device hardware database may provide diagnostics to analyze the failures and service tendencies of the self-service device to provide root cause analysis. Additionally, the self-service device hardware database may record a plurality of transactions at the self-service device. The plurality of transactions may include a volume of the plurality of transactions at the self-service device, a total amount of the plurality of transactions at the self-service device, and changes in the volume of the plurality of transactions at the self-service device. Further, the processor and the self-service device hardware database may analyze the support ticket for consolidation with other maintenance requests for the plurality of self-service devices in a geographic area and consolidation with other maintenance requests for the self-service device.

In another aspect of the invention, the self-service device system may further include an electronic locking system located at the self-service device configured to lock the self-service device, wherein the electronic tracking system includes a programmed key code in order to open the self-service device for servicing.

In another aspect of the invention, a method of servicing a self-service device may include the steps of: receiving an indication of a maintenance request from a self-service device; analyzing, by a processor, the maintenance request and a configuration of the self-service device, wherein the configuration includes information about the self-service device; receiving a scanned support ticket from the self-service device, wherein the scanned support ticket includes the configuration of the self-service device; and logging, by a processor, the scanned support ticket from the self-service device into an self-service device hardware database. The method may further include providing, by a processor, predictable faults and maintenance for the self-service device. The method may further include the self-service device hardware database detecting an improper self-service device coming online through analysis and verification of one or more data elements from the self-service device hardware database. The analyzing step may further include analyzing the maintenance request for consolidation with other maintenance requests for other self-service devices in a geographic area, analyzing the maintenance request for consolidation with other maintenance requests for the self-service device, or analyzing the maintenance request and the self-service device for root cause analysis. The method of servicing an self-service device may further include recording, by a processor, a plurality of transactions at the self-service device, wherein the plurality of transactions includes a volume of the plurality of transactions at the self-service device, a total amount of the plurality of transactions at the self-service device, and changes in the volume of the plurality of transactions at the self-service device.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
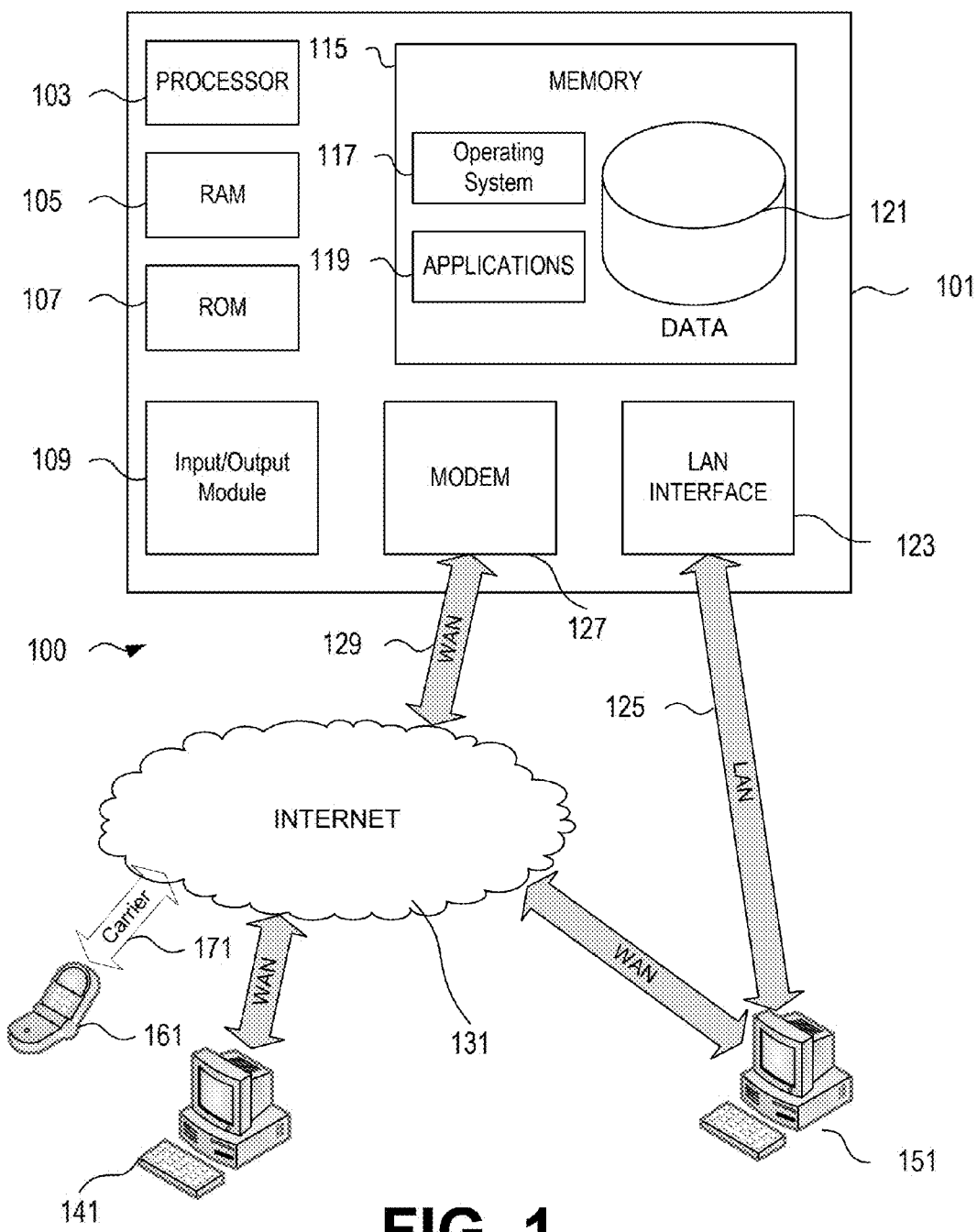
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115. According to aspects of the invention, the computing environment 100 may represent self-service device service systems, self-service device maintenance systems, and/or self-service device service centers, or any combination thereof.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks) including various other components, such as a battery, speaker, and antennas (not shown). The service computing devices 141 and 151 may be personal computing devices or servers that include many or all of the elements described above relative to the computing device 101. Service computing device 161 may be a mobile device communicating over wireless carrier channel 171, for example as may be utilized and/or carried by a service technician during a service call.

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, and/or data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Figure 2:
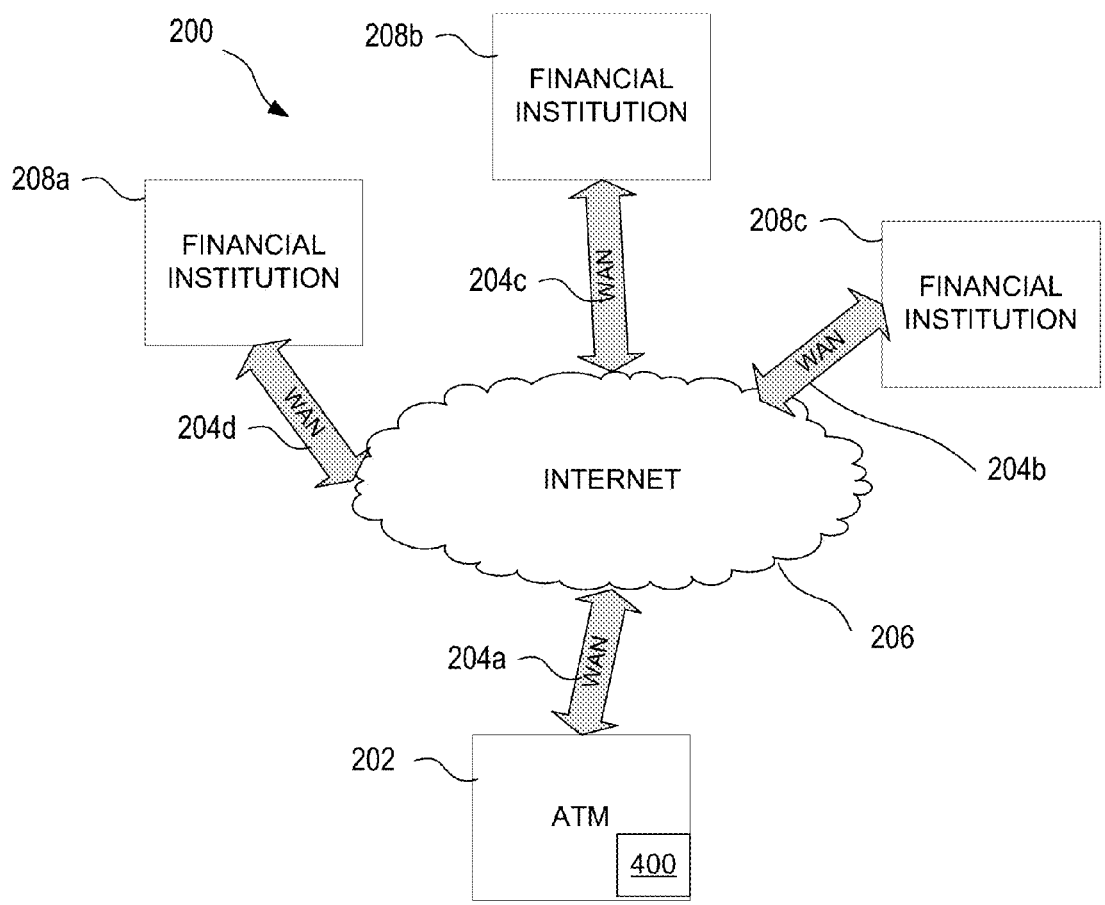
FIG. 2 illustrates an example self-service device environment according to one or more aspects described herein.

The systems, devices, and/or networks of FIG. 1 may, in one or more arrangements, be used to provide functionality to one or more self-service devices, such as cash handling devices or automated teller machines (ATMs). Self-service devices are commonly used to provide access to financial transactions without requiring an individual, such as a bank teller, to complete the transaction. Self-service devices are often associated with one or more financial institutions, however, typical self-service devices are accessible to both customers of the associated financial institution and non-customers, sometimes for a fee. One example self-service device environment 200 is shown in FIG. 2. The self-service device 202 is connected, via WAN and/or LAN 204a-204d to a network 206, such as the Internet, to communicate with one or more financial institutions 208a-208c. One of financial institutions 208a-208c, such as financial institution 208a, may be associated with the self-service device 202 while the others, such as financial institutions 208b, 208c may not be associated with the self-service device 202 but may communicate with the self-service device 202 to complete transactions by customers associated with the financial institutions 208b, 208c and conducted at the self-service device 202.

Figure 3:
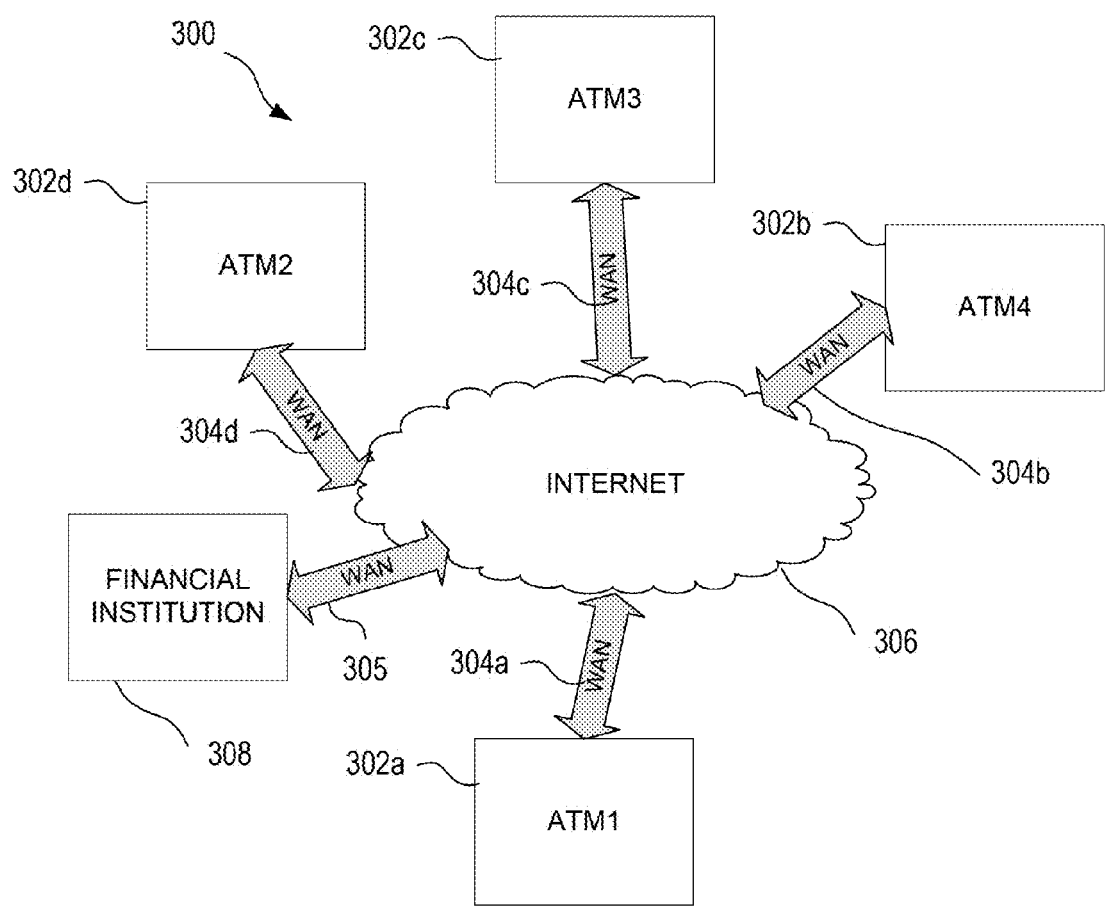
FIG. 3 illustrates another example self-service device environment according to one or more aspects described herein.

In some instances, a financial institution may have several self-service devices. For instance, FIG. 3 illustrates one example computing environment in which a plurality of self-service devices 302a-302d are in communication with each other (such as via WAN 304a-304d) via a network 306, such as the Internet. Further, the financial institution 308 with which the self-service devices 302a-302d are associated may also be connected to the network 306, such as via WAN 305 to permit communication between each self-service device and the financial institution. In some examples, the status of one or more self-service devices 302a-302d, capacity available at one or more self-service devices 302a-302d, and/or maintenance status of one or more self-service devices 302a-302d, may be communicated to or known by other self-service devices 302a-302d and/or the financial institution.

In an aspect according to this invention, methods or processes may utilize a self-service device hardware database 121 and a self-service device support ticket 400 located and/or attached to each individual self-service device 202. The self-service device support ticket 400 may include information regarding information about the self-service device 202, such as model, serial numbers, services, software configuration, printer configuration, components, part numbers, information related to any current fault status or recent faults, and any other information that may be important to a self-service device 202. The self-service device support ticket 400 may be located or attached anywhere on the self-service device 202. In an example according to this invention, the self-service device support ticket 400 may be located on a rear-panel or inside the device chassis, such as in an area that may be accessed by a technician during their normal maintenance procedures. The self-service device support ticket 400 may not be accessed by a customer utilizing the self-service device 202 during normal business operations. The self-service device support ticket 400 may be a QR code or a barcode or a decal that includes this information. Additionally, support tickets or stickers may be provided on parts and/or components to scan. These support tickets for the parts and/or components may be a QR code or a barcode or any other way to identify the parts and/or components.

Aspects of this invention may also include a list of service codes. The list service codes may be located on the self-service device 202, wherein the technician may be able to scan or view easily, such as the rear-panel or inside the device chassis of the self-service device 202. The technician may then scan in the correct service codes when performing the services/maintenance. This may prevent the service technicians from having to type in entries. This may also allow the service codes to be linked to the parts being installed into the self-service devices 202. The self-service device hardware database 121 may provide a condition of components, for example a condition or time until service is required for each of the individual components or sets of components.

The use of a self-service device support ticket 400 may provide a labeling method to store and track all self-service device components and any other pertinent information. Service calls may then be routed to the appropriate technician by leveraging the information captured on the self-service device support ticket 400. The service technician may utilize an application on a handheld device (such as the handheld device 161 depicted in FIG. 1) to scan the self-service device support ticket 400. By scanning the self-service device support ticket 400, the list of all components of the self-service device 202 may be uploaded to the self-service device hardware database 121. Additionally, by scanning the self-service device support ticket 400, the self-service device hardware database 121 may maintain the information of the self-service device service location where the self-service device maintenance is being worked on. The handheld device 161 may be utilized by the service technician to contact support instead of calling or requiring a service call. This may provide an automated routing and queuing of service tickets based on information in the self-service device hardware database 121.

Additionally, the use of the self-service device support ticket 400 and the self-service device hardware database 121 may provide predictive maintenance requests. The self-service device service system 100 may provide analysis to provide predictable faults and maintenance. This predictive maintenance analysis may save on the number of dispatches of technicians as the technicians may be consolidated for visits to the self-service devices 202. In another predictive example, it may be determined through analysis at the self-service device service system 100 that certain self-service devices 202 are running a configuration that has limited problems or failures. The decision may be then made to run that configuration throughout the field of self-service devices 202.

Aspects of this invention may include a self-service device hardware database 121 and the automatic building and updating of the self-service device hardware database 121. By providing an automatic system and process to build and update using the self-service device hardware database 121 provides a better way to capture the information, which may provide "tree" functionality for questions based on the information provided. The self-service device hardware database 121 provides one-stop storage for all the information regarding an self-service device 202. In one aspect of the invention, a scanner may be provided to scan information from the self-service device 202 or to automatically send information from the self-service device 202 to capture components and capture when service updates are made to the self-service device 202. As was discussed and described above, the scanner may be a handheld device 161, such as a PDA, mobile phone, smart phone, tablet computer, laptop computer, or other mobile means capable of receiving and/or transferring information. Throughout the entire life of the self-service device 202, the building, the deployment, and the maintenance/servicing may be scanned and/or updated and validated utilizing the self-service device hardware database 121.

For example, when a self-service device 202 is being built and/or maintained, a self-service device support ticket 400 could be scanned that would automatically update that self-service device's configuration in the self-service device hardware database 121. Additionally, the self-service device hardware database 121 could provide verification to ensure that the correct parts are being added and installed to the correct machine type. The self-service device hardware database 121 may part of a self-service device maintenance/service system 100. The self-service device maintenance/service system 100 may be located at a centralized service center.

In accordance with other aspects of this invention, the self-service device hardware database 121 may perform other functions. The self-service device hardware database 121 may alert the self-service device service system 100 and/or technician if the wrong parts are scanned and attempted to be installed or replaced in the self-service device 202. Also, the self-service device hardware database 121 may track parts. The self-service device hardware database 121 may also confirm and validate that the parts are actually replaced when they are supposed to be replaced and installed. Additionally, the self-service device hardware database 121 and self-service device service system 100 may provide a way for the self-service device 202 to know what new parts were loaded to confirm the work/services were completed. The self-service device hardware database 121 and self-service device service system 100 may automatically provide a means to self-validate from the machine of the new equipment installed or the new configuration loaded.

The self-service device hardware database 121 and self-service device service system 100 may also provide a means to capture self-service devices that are being broken into or tampered with by providing diagnostic and analytic information that is indicative of a self-service device being broken into or tampered with. For example, the self-service device hardware database may detect an improper self-service device coming online through the analysis and verification of one or more data elements from the self-service device hardware database, MAC address, IMEI, component checks, central processor unit (CPU) serial numbers, and/or other identification means.

Aspects of this invention may include systems and/or methods for providing end-to-end communication regarding the status of the self-service devices 202 from the service technicians to the service center in an automated manner. Additional aspects of this invention may include systems and/or methods that provide the ability to keep current and up-to-date with the self-service device configurations when parts are installed or components are swapped and services are performed. This information may all be maintained in the self-service device hardware database 121.

Aspects of this invention may provide an electronic locking system. The electronic locking system may be located at the self-service device 202. The electronic locking system may also be required for the technician in order to scan and send information to and from the self-service device hardware database 121. The electronic locking system may include a programmed key type or code in order to open the electronic locking system.

Figure 4:
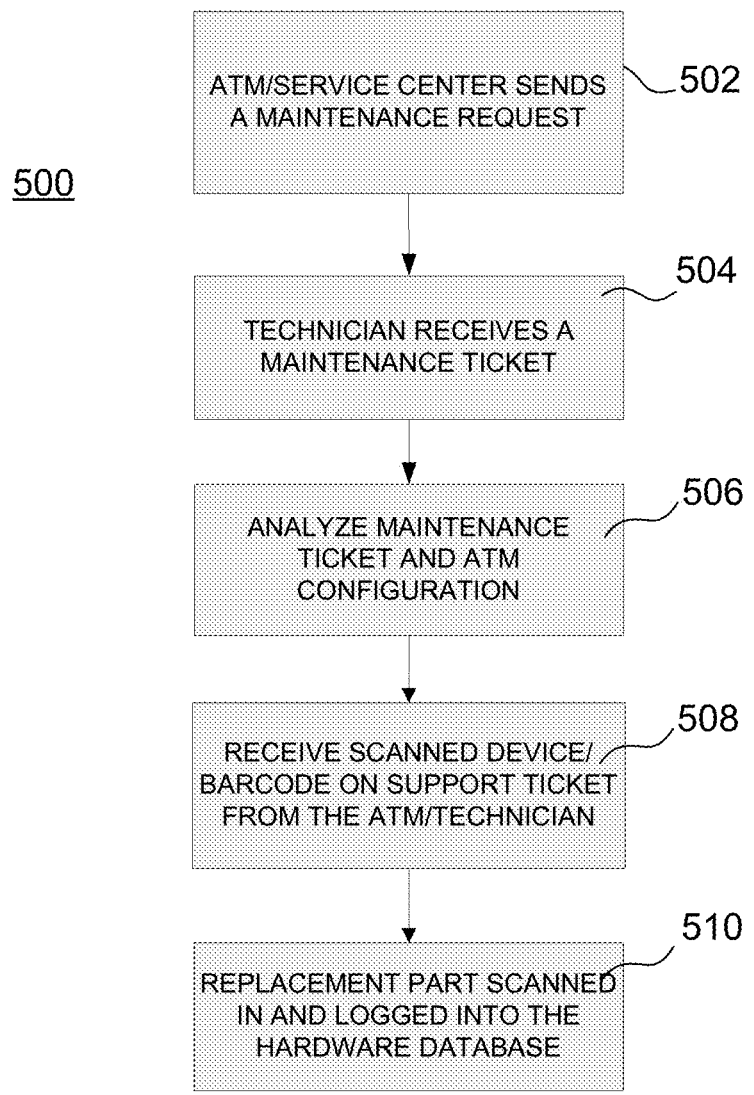
FIG. 4 illustrates an example method of self-service device servicing according to one or more aspects described herein.

FIG. 4 illustrates one example method of servicing a self-service device 202, such as cash handling devices or automated teller machines (ATMs), according to aspects of this invention described herein. In step 502, a self-service device service center sends a maintenance request. The maintenance request may be automatically generated as periodic maintenance required for the self-service device 202. The maintenance request may also be generated from a malfunction reported via customers or via the owner of the self-service device. Additionally, the maintenance request may be sent directly from the self-service device. In aspects of this invention, the self-service device 202 may be capable of generating a maintenance request based on either a predictive malfunction or based on a periodic scheduled maintenance.

In step 504, a technician may receive the maintenance request sent from the self-service device service center or directly from the self-service device 202. The technician may receive this maintenance request via a handheld device 161, such as a PDA, mobile phone, smart phone, tablet computer, laptop computer, or other mobile means capable of receiving and/or transferring information.

In step 506, the method may include analyzing the maintenance request and the self-service device configuration. In this step, the maintenance request may be analyzed by an self-service device service/maintenance system 100. The maintenance request may be analyzed for consolidation with other maintenance tickets located in a geographic similar area for a single technician to travel to and repair. For example, if a maintenance request is sent in for a self-service device 202 located in city A and there is a maintenance request sent in for a self-service device 202 located in city B, the two maintenance requests may be consolidated for one technician to repair if city A and city B are geographically close to each other. The maintenance request may also be analyzed for consolidation with other maintenance requirements for a given self-service device 202. For example, if a self-service device 202 receives a maintenance ticket for a malfunctioning component and during the analysis, it is found that the self-service device 202 needs periodic maintenance on another part in the near future, the maintenance requests and the periodic maintenance for the one self-service device 202 may be consolidated. Additionally, the maintenance request may be analyzed for further analytics and/or root cause analysis. For example, the maintenance request may be analyzed against similarly configured self-service devices 202 to compare maintenance and/or performance issues. These maintenance requests may be analyzed and utilized to determine or modify any periodic scheduled maintenance requirements for a self-service device 202. Additionally, the maintenance request may be analyzed for specialized maintenance to be performed on the self-service device 202.

In step 508, the method may include the step of receiving the scanned device barcode on the self-service device support ticket 400 or information from the technician or the self-service device 202 directly. Once the technician arrives at the self-service device 202, the technician may first scan the self-service device support ticket 400. The technician may scan the self-service device support ticket 400 utilizing a handheld device 161, such as a PDA, mobile phone, smart phone, tablet computer, laptop computer, or other mobile means capable of receiving and/or transferring information. After the self-service device support ticket 400 is scanned, the handheld device 161 may automatically send the information from the scanned device barcode to the self-service device hardware database 121 or self-service device/maintenance service system 100. In another aspect of the invention, when the technician arrives at the self-service device 202, the technician may prompt the self-service device 202 to automatically send the information from the scanned device barcode to the self-service device hardware database 121 or self-service device/maintenance service system 100.

In step 510, the method may include receiving the scanned replacement part from the technician of the self-service device 202 directly. The technician may first scan the replacement part, or scan a barcode associated with the replacement part prior to the technician installs a replacement part at the self-service device 202. The technician may scan the replacement part utilizing the handheld device 161, such as a PDA, mobile phone, smart phone, tablet computer, laptop computer, or other mobile means capable of receiving and/or transferring information. Once the replacement part is scanned, the handheld device 161 may automatically send the information from the scanned device barcode to the self-service device hardware database 121 or self-service device/maintenance service system 100.

In addition to or in place of receiving the scanned replacement part, in step 510, the method may include receiving the services/performed maintenance from the technician of the self-service device directly. The technician may scan or input into the handheld device 161 the services and/or the maintenance performed on the self-service device 202. The handheld device 161 may then automatically send the information regarding the services and/or maintenance performed to the self-service device hardware database 121 or self-service device/maintenance service system 100.

In another aspect of this invention, a master sticker may be located on the self-service device 202 that contains all the information for tracking components, replacement parts, and/or services/maintenance schedule. This information may be scanned in when new components or replacement parts are installed or added. Additionally, this information may be scanned in when a service or maintenance is completed. When there are maintenance needs and a technician needs to call a support team for assistance, the technicians can obtain the support team with the correct experience by knowing exactly how each self-service device 202 is configured. As was described above, the scanning can be done on a hand-held device 161 or done directly from the self-service device 202. Additionally, there may be visibility to all support tickets for a particular self-service device 202, and this information may be utilized to consolidate the support team and technician as well as make a better judgment on what could be cause of the problems or issues.

In another aspect of the invention, by utilizing the self-service device support ticket 400 as described above and/or the hardware database 121, technicians with certain specialties may be utilized on certain self-service devices. For example, after the self-service device maintenance/service system 100 determines and the information is sent from the scanning of the self-service device support ticket 400 on the self-service device 202 what kind of maintenance and/or service is needed at the particular self-service device 202, the self-service device maintenance/service system 100 may route the self-service device support ticket 400 to a technician that is specialized in that certain area and provide routing preferences.

In another aspect of the invention, by utilizing the self-service device support ticket 400 as described above and/or the hardware database 121, analytics may be utilized to analyze the failures and/or service tendencies. For example, the self-service device service system 100 may track multiple self-service devices 202 with printer failures, all from the same model/build, and possibly all the same printer part number. The self-service device service system 100 may then provide a message or an automatic service to replace the failing printer part number. Additionally, the self-service device service center 100 or a technician may be able to contact the vendor of the failing printer part to correct the issue with a third-party vendor.

In another aspect of this invention, by utilizing the self-service device support ticket 400 as described above and/or the self-service device hardware database 121, better visibility of the self-service devices 202, the components, and the parts may be provided to business units and business decision-makers. For example, because of the one-stop-storage of information about the self-service devices 202 being stored in the self-service device hardware database 121, business decisions may be made based on this information in the self-service device hardware database 121. The information will be accurate and up-to-date and will not need to be verified against multiple other reporting systems and or information sources. Additionally, other business groups within an organization may access the self-service device hardware database 121 to get further information that could help them make business decisions as well.

In another aspect of this invention, the self-service device 202 and the self-service device service center 100 and/or the self-service device hardware database 121 may include multi-directional communication between systems. For example, not only can the self-service device 202 talk/communicate the services/maintenance to the self-service device service center 100 and/or the self-service device hardware database 121, the self-service device hardware database 121 and/or self-service device service center 100 may communicate information to the self-service device 202.

In another aspect of this invention, the self-service device hardware database 121 may be capable of charting or recording the details of the financial transactions that occur at the self-service device 202. For example, these financial transactions may include but not be limited to: volume of the transactions at the self-service device 202, amount of the transactions at the self-service device 202, and/or changes in the transaction volume at the self-service device 202. Other financial transactions and information may be charted and recording without departing from this invention.

In another aspect of this invention, the self-service device hardware database 121 and/or the self-service device service center 100 may be capable of providing diagnostic capabilities to the self-service device 202. For example, the self-service device hardware database 121 and/or the self-service device service center 100 may diagnose issues with the self-service device software with a specified central processing unit (CPU).

In another aspect of this invention, the self-service device hardware database 121 and/or the self-service device service center 100 may provide notification to personnel and technicians of changes or updates that are not working well or are not working as expected. This may allow technicians to change or vary their maintenance plan in order to attempt to alleviate the issues from the previously identified changes or updates.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A financial self-service device system, comprising:
   a processor;
   a self-service device, wherein the self-service device includes a self-service device support ticket attached to the self-service device; and
   a self-service device hardware database that includes information about one or more self-service devices,
   wherein a set of data from the self-service device support ticket is scanned during a maintenance request for the self-service device and the set of data is transferred to the self-service device hardware database.

2. The financial self-service device system of claim 1, wherein the self-service device support ticket includes one or more of the following: self-service device model number, self-service device serial number, services, required, printer configuration, software configuration, component numbers, or part numbers.

3. The financial self-service device system of claim 1, wherein the self-service device support ticket is a barcode.

4. The financial self-service device system of claim 1 further including a handheld wireless device configured to scan and store the set of data from the self-service device support ticket and communicate the set of data to the self-service device hardware database.

5. The financial self-service device system of claim 1, wherein the processor and the self-service device hardware database provide predictable faults and maintenance for the self-service device.

6. The financial self-service device system of claim 1 further including an electronic locking system located at the self-service device configured to lock the self-service device, wherein the electronic tracking system includes a programmed key code in order to open the self-service device for servicing.

7. The financial self-service device system of claim 1, wherein the processor and the self-service device hardware database provide diagnostics to analyze failures and service tendencies of the self-service device to provide root cause analysis.

8. The financial self-service device system of claim 1, wherein the self-service device hardware database records a plurality of transactions at the self-service device, and further wherein the plurality of transactions includes a volume of the plurality of transactions at the self-service device, a total amount of the plurality of transactions at the self-service device, and changes in the volume of the plurality of transactions at the self-service device.

9. The financial self-service device system of claim 1, wherein the processor and the self-service device hardware database analyze the support ticket for consolidation with other maintenance requests for a plurality of self-service devices in a geographic area and consolidation with other maintenance requests for the self-service device.

10. A method of servicing a financial self-service device, comprising:
receiving an indication of a maintenance request from a financial self-service device;
analyzing, by a processor, the maintenance request and a configuration of the self-service device, wherein the configuration includes information about the self-service device;
receiving a scanned support ticket from the self-service device, wherein the scanned support ticket includes the configuration of the self-service device; and
logging, by the processor, the scanned support ticket from the self-service device into an self-service device hardware database.

11. The method of claim 10 further includes providing, by the processor, predictable faults and maintenance for the self-service device.

12. The method of claim 10, wherein the self-service device hardware database detects an improper self-service device coming online through analysis and verification of one or more data elements from the self-service device hardware database.

13. The method of claim 10 further includes the steps of:
receiving a scanned barcode associated with a replacement part installed in the self-service device, wherein the scanned barcode includes information about the replacement part; and
sending, by the processor, the information from the scanned barcode to the self-service device hardware database.

14. The method of claim 10, wherein the analyzing step further includes analyzing the maintenance request for consolidation with other maintenance requests for the self-service device.

15. The method of claim 10, wherein the analyzing step further includes analyzing the maintenance request and the self-service device for root cause analysis.

16. The method of claim 10, further including the steps of:
recording, by the processor, a plurality of transactions at the self-service device, wherein the plurality of transactions includes a volume of the plurality of transactions at the self-service device, a total amount of the plurality of transactions at the self-service device, and changes in the volume of the plurality of transactions at the self-service device.

17. A financial self-service device system, comprising:
a processor;
a financial self-service device, wherein the self-service device includes a self-service device support ticket attached to the self-service device;
a self-service device hardware database that includes information about a plurality of self-service devices; and
a handheld wireless device configured to scan and store a set of data from the self-service device support ticket and communicate the set of data to the self-service device hardware database,
wherein the set of data from the self-service device support ticket is scanned during a maintenance request and the set of data is transferred to the self-service device hardware database and further wherein the processor and the self-service device hardware database provide diagnostics to analyze failures and service tendencies of the self-service device to provide root cause analysis of the maintenance request, and further wherein the processor and the self-service device hardware database provide predictable faults and maintenance of the maintenance request for the self-service device.

18. The financial self-service device system of claim 17, wherein the self-service device support ticket includes one or more of the following: self-service device model number, self-service device serial number, services, required, printer configuration, software configuration, component numbers, or part numbers.

19. The financial self-service device system of claim 18, wherein the self-service device hardware database records a plurality of transactions at the self-service device, and further wherein the plurality of transactions includes a volume of the plurality of transactions at the self-service device, a total amount of the plurality of transactions at the self-service device, and changes in the volume of the plurality of transactions at the self-service device.

20. The financial self-service device system of claim 19, wherein the processor and the self-service device hardware database analyze the support ticket for consolidation with other maintenance requests for the plurality of self-service devices in a geographic area and consolidation with other maintenance requests for the self-service device.

* * * * *